US007038675B2

(12) United States Patent
Kawamura et al.

(10) Patent No.: US 7,038,675 B2

(45) Date of Patent: May 2, 2006

(54) LIQUID CRYSTAL DISPLAY DEVICE AND MANUFACTURING METHOD THEREOF

(75) Inventors: Tetsuya Kawamura, Mobara (JP); Yoshihiro Imajo, Mobara (JP)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 10/253,930

(22) Filed: Sep. 25, 2002

(65) Prior Publication Data

US 2003/0058208 A1 Mar. 27, 2003

(30) Foreign Application Priority Data

Sep. 27, 2001 (JP) ............................ 2001-295268

(51) Int. Cl.
*G09G 5/00* (2006.01)
*G02F 1/1343* (2006.01)
*G02F 1/1345* (2006.01)

(52) U.S. Cl. ........................ 345/211; 349/140; 349/149

(58) Field of Classification Search ........ 345/211–212; 349/149–152, 140; 323/297–298, 352–354

See application file for complete search history.

(56) References Cited

U.S. PATENT DOCUMENTS

| | | | | |
|---|---|---|---|---|
| 5,745,092 | A * | 4/1998 | Ito | 345/95 |
| 6,256,025 | B1 * | 7/2001 | Imai et al. | 345/211 |
| 6,437,716 | B1 * | 8/2002 | Nakao | 341/118 |
| 6,567,064 | B1 * | 5/2003 | Song et al. | 345/94 |
| 6,633,271 | B1 * | 10/2003 | Motegi et al. | 345/87 |
| 6,697,060 | B1 * | 2/2004 | Tsuchiya | 345/212 |

* cited by examiner

*Primary Examiner*—Xiao Wu
*Assistant Examiner*—M. Fatahiyar
(74) *Attorney, Agent, or Firm*—Antonelli, Terry, Stout and Kraus, LLP.

(57) ABSTRACT

In a liquid crystal display device formed of a plurality of a liquid crystal display elements in which a liquid crystal material is supported between first and second substrates, plural semiconductor chips for operating the liquid crystal display elements, and a power source circuit, a resistance voltage-dividing circuit is mounted on a peripheral portion along one side of the first substrate, which resistance voltage-dividing circuit divides the voltage supplied from the power source circuit and supplies the divided voltage to each of the semiconductor chips. This allows the resistance voltage-dividing circuit to be easily modified, so that the period until the product forwarding of the liquid crystal display devices is shortened without increasing the cost even after various kinds of design changes have been implemented.

16 Claims, 7 Drawing Sheets

LIQUID CRYSTAL DISPLAY DEVICE AND MANUFACTURING METHOD THEREOF

BACKGROUND OF THE INVENTION

The present invention relates to a liquid crystal display device; and, more particularly, the invention relates to a technique that is effective when applied to a driving circuit of the liquid crystal display device, in a system for transferring a digital signal between driving circuits (drain drivers).

A liquid crystal display module of the STN (super Twisted Nematic) system or the TFT (Thin film Transistor) system, having a large-sized liquid crystal display panel with a pixel number of e.g., 800×480×3, or more in a panel capable of producing a color display, is widely used as a display device in a notebook type of personal computer, etc. These liquid crystal display devices have a liquid crystal display panel and a driving circuit for operating the liquid crystal display panel.

For example, JP-A-6-13724/1994, discloses a method (hereinafter called a digital signal sequential transfer method) in which a digital signal (e.g., display data or a clock signal) is inputted to only the head driving circuit of cascade-connected driving circuits, and then the digital signal is sequentially transferred to the other driving circuits through the interior of the driving circuits in a liquid crystal display device. In the liquid crystal display device described in this publication (JP-A-6-13724/1994), a semiconductor integrated circuit device (IC) constituting the driving circuit is directly mounted on a glass substrate of the liquid crystal display panel.

FIG. 9 is a block diagram showing the basic construction of a liquid crystal display panel employed in a conventional liquid crystal display device using the digital signal sequential transfer method mentioned above. In the liquid crystal display panel shown in this figure, a timing controller (or a display control device) 110, a plurality of drain drivers 130 and a plurality of gate drivers 140 are respectively mounted on peripheral portions along two sides of a transparent insulating substrate (glass substrate) constituting a TFT substrate of the liquid crystal display panel 100.

A digital signal (display data, a clock signal, etc.), that is sent from the timing controller 110, and a gray scale reference voltage, that is supplied from a power source circuit, are inputted to the head drain driver 130, and these signals are propagated in respective internal signal line within each drain driver 130 and on respective transmission line paths (a wiring layer on the glass substrate) between the respective drain drivers 130, and are, in this way, inputted to each drain driver 130. The source voltage of each drain driver 130 is supplied from a power source circuit 120 to each drain driver 130 through a flexible printed wiring board (hereinafter simply called an FPC board) 150.

Similarly, the digital signal (clock signal, etc.) sent from the timing controller 110 is inputted to the head gate driver 140, and this signal is propagated in an internal signal line within each gate driver 140 and a transmission line path between the respective gate drivers 140, and is, in this way, inputted to each gate driver 140. However, on the gate driver side, the source voltage of the gate driver 140, that is supplied from the power source circuit 120, is also supplied to the head gate driver 140, and this voltage is supplied to each gate driver 140 through an internal power source line within each gate driver 140 and a transmission line path between the respective gate drivers 140.

SUMMARY OF THE INVENTION

The above-referenced power source circuit 120 has a DC—DC converter. Plural output voltages having respectively different voltage levels are generated from an input voltage at a single voltage level by this DC—DC converter, and the plural output voltage are supplied as source voltages of each drain driver 130 and each gate driver 140. Two output voltages generated by the DC—DC converter are divided by a resistance voltage-dividing circuit, so that plural gray scale reference voltages are generated. These gray scale reference voltages are supplied to the respective drain drivers 130.

In the design of such a system, there is a possibility that the specification of the source voltage to be supplied to each drain driver 130 and each gate driver 140 will be changed between the time of the product design starting stage and the time of the product forwarding stage. Further, there is the situation in which the specification of the number of gray scale reference voltages supplied to the respective drain drivers 130 will need to be changed in response to, e.g., intended use, customer request, etc. However, when the specification of the power source circuit 120 is changed in response to such situations, problems exist in that the period until the forwarding of the liquid crystal display module to the customer is lengthened, and the cost of the power source circuit 120 is increased, so that the overall cost of the liquid crystal display module is increased.

Thus, in the conventional liquid crystal display device, for example, problems exist when it is necessary to change the specification of the power source circuit in accordance with a design change in the liquid crystal display panel, etc., with the result that the period until the forwarding of the liquid crystal display device to the customer is long and the cost is further increased.

To solve the above-described problems, an object of the present invention is to provide a technique that makes it possible to shorten the period until the product is ready for forwarding, and to reduce the cost involving various kinds of design changes, in comparison with the conventional case in the liquid crystal display device.

The above and other objects and novel features of the present invention will become more apparent from the following description and the accompanying drawings.

A summary of typical features of the invention disclosed in this application will be briefly described as follows.

Namely, the present invention resides in a liquid crystal display device comprising a liquid crystal display panel having a liquid crystal material supported between first and second substrates; plural semiconductor chips for operating a plurality of liquid crystal display elements disposed in a matrix array in said panel; and a power source circuit; wherein said first substrate has a resistance voltage-dividing circuit mounted on a peripheral portion at one side thereof, and said resistance voltage-dividing circuit operates to divide the voltage supplied from said power source circuit and to supply the divided voltage to each of said semiconductor chips.

In a preferred embodiment, the present invention is characterized in that said plural semiconductor chips are mounted at least on peripheral portions at two adjacent sides of said first substrate.

In a preferred embodiment, the present invention is also characterized in that said plural semiconductor chips are arranged as semiconductor chips of a first group mounted on a peripheral portion of a first side of said first substrate, and semiconductor chips of a second group mounted on a peripheral portion of a second side, adjacent to said first side, of said first substrate; and said resistance voltage-dividing circuit operates to divide the voltage supplied from said power source circuit, to generate plural gray scale reference voltages, and to supply the plural gray scale reference voltages to the semiconductor chips of said first group.

In a preferred embodiment, the present invention is also characterized in that said plural semiconductor chips are disposed as semiconductor chips of a first group arranged on a first side of said first substrate, and semiconductor chips of a second group arranged on a second side, adjacent to said first side, of said first substrate; and said resistance voltage dividing circuit operates to divide the voltage supplied from said power source circuit, to generate plural gray scale reference voltages, and to supply the plural gray scale reference voltages to the semiconductor chips of said first group.

The present invention also resides in a method of manufacture of a liquid crystal display device comprising a liquid crystal display panel having a liquid crystal material supported between first and second substrates; plural semiconductor chips for operating a plurality of liquid crystal display elements disposed in a matrix array in said panel; and a power source circuit; wherein said first substrate has a resistance voltage-dividing circuit mounted on a peripheral portion at one side thereof; and said resistance voltage-dividing circuit operates to divide the voltage supplied from said power source circuit and to supply the divided voltage to each of said semiconductor chips; the manufacturing method comprising a first process for forming plural voltage-dividing resistance elements constituting said resistance voltage-dividing circuit on said first substrate; and a second process for adjusting at least one resistance value among the plural resistance elements formed in said first process.

In a preferred mode, the present invention is also characterized in that said first process includes a process for constructing at least one of said plural voltage-dividing resistance elements by use of a parallel resistance circuit having plural resistance elements electrically connected in parallel; and said second process is a process for retaining at least one of said plural resistance elements constituting said parallel resistance circuit, and separating the other resistance elements from said at least one resistance element.

In a preferred mode, the present invention is also characterized in that said first process includes a process for constructing at least one of said plural voltage-dividing resistance elements by use of a first resistance element and plural resistance elements arranged near said first resistance element; and said second process is a process for electrically connecting at least one of said plural resistance elements in parallel to said first resistance element.

In a preferred mode, the present invention is also characterized in that said first process includes a process for constructing at least one of said plural voltage-dividing resistance elements by use of a resistance element and an element for short-circuiting, having one end connected to one end of said resistance element and also having the other end in an open state; and said second process is a process for electrically connecting the other end of said element for short-circuiting to an arbitrary position of said resistance element.

DETAILED DESCRIPTION

Figure 1:
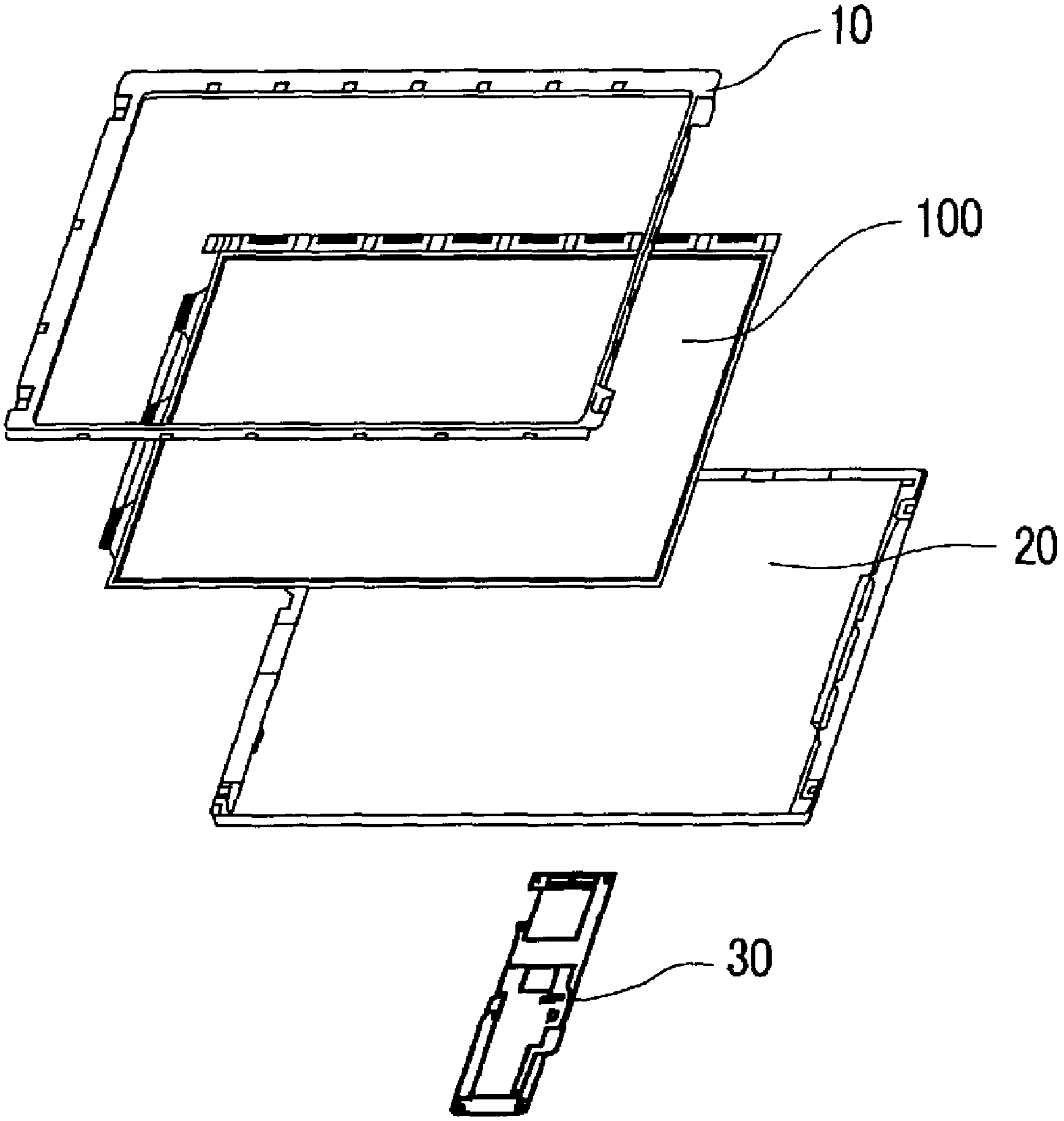
FIG. 1 is an exploded perspective view showing the schematic construction of a liquid crystal display module according to an embodiment of the present invention.

Various embodiments of the present invention will be explained in detail with reference to the drawings. In all of the figures, members having the same functions are designated by the same reference numerals, and any repetitious explanation will be omitted.

FIG. 1 is an exploded perspective view showing an example of the basic construction of a liquid crystal display module according to an embodiment of the present invention. As shown in this figure, the liquid crystal display module of this embodiment is constructed such that a liquid crystal display panel 100 is stored between a frame (upper side case) 10, that is constructed by a metal plate and formed in a frame shape, and a back light unit 20. An interlace circuit substrate 30, having a power source circuit 120, is arranged on the rear side of the back light unit 20.

The back light unit is generally constructed to include a cold cathode fluorescent lamp, a wedge-shaped (trapezoidal side-face-shaped) light guide body, a diffusion sheet, a prism sheet, a reflection sheet, and a housing for each of the above parts. However, since this construction of the back light unit does not relate to the present invention, a detailed explanation thereof is omitted.

The power source circuit 120 is arranged in the interlace circuit substrate 30. For example, display data and a control signal (a clock signal, a horizontal synchronizing signal, a vertical synchronizing signal, a display timing signal) sent from the main frame of a computer, etc. are also supplied to this interlace circuit substrate 30. The display data and the control signal are supplied to a timing controller by connecting the interlace circuit substrate 30 and a glass substrate, constituting a TFT substrate of the liquid crystal display panel 100 through a flexible wiring board.

Figure 2:
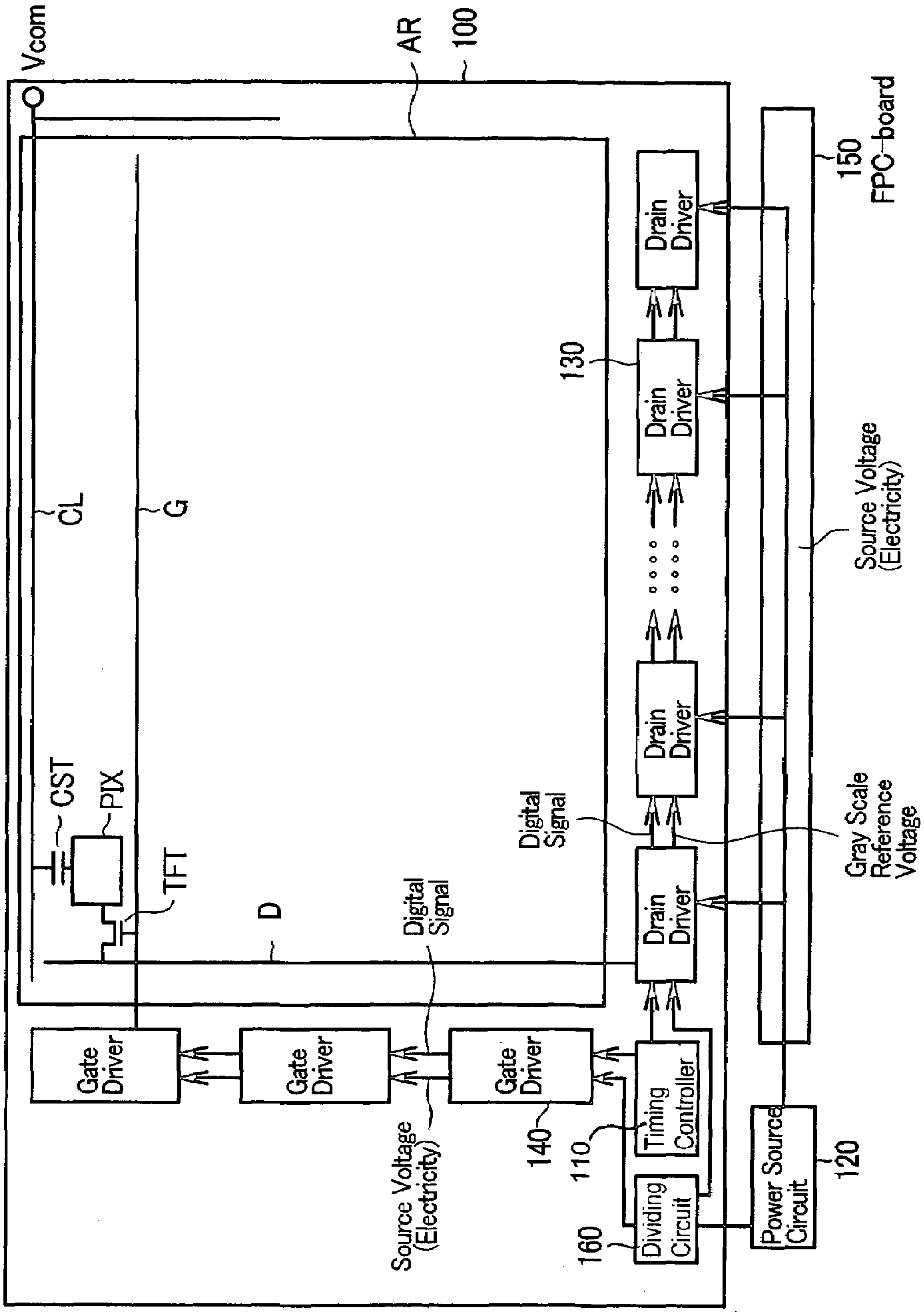
FIG. 2 is a block diagram showing the basic construction of a display panel of the liquid crystal display module according to the embodiment of the present invention.
Figure 9:
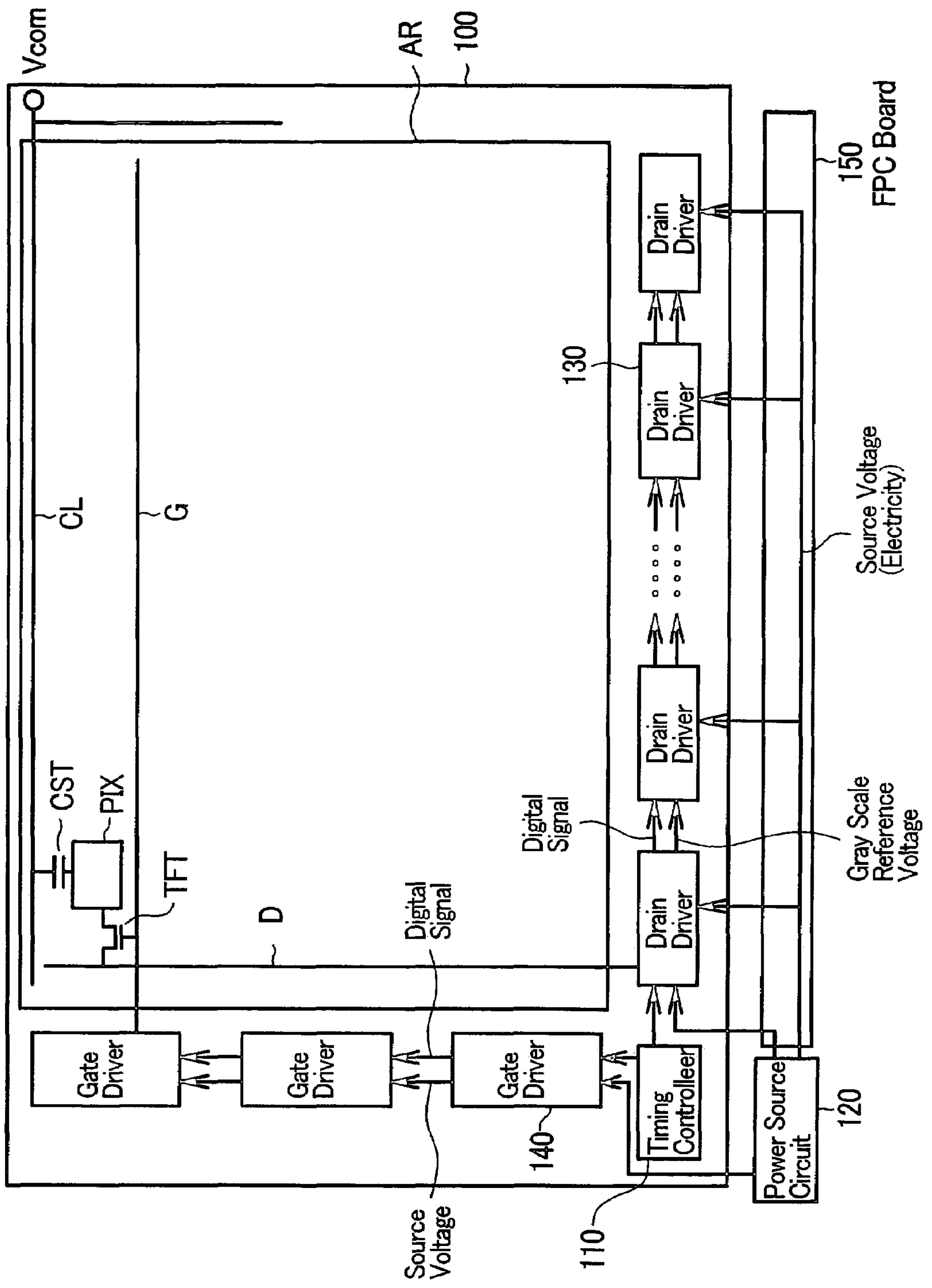
FIG. 9 (PRIOR ART)
FIG. 9 is a block diagram showing the basic construction of the display panel of a conventional liquid crystal display module.

FIG. 2 is a block diagram showing the basic construction of the liquid crystal display panel of the liquid crystal display module in the embodiment of the present invention. In FIGS. 2 and 9, reference numeral AR designates an effective display area.

In the construction of the liquid crystal display panel 100, the TFT substrate, on which there are formed a pixel electrode PIX, a thin film transistor (TFT), etc., and a filter substrate, on which there are formed a counter electrode, a color filter, etc., are spaced and overlapped with each other with a predetermined gap therebetween, and these substrates are stuck to each other by a sealing material arranged in a frame shape in the vicinity of a peripheral portion between both substrates. A liquid crystal material is sealed and held inside the space defined by the sealing material between both substrates, being injected into this space through a liquid crystal sealing port formed in one portion of the sealing material. Further, a respective polarizer plate is stuck to the outsides of both substrates.

Each pixel has a pixel electrode PIX and a thin film transistor (TFT), and is formed within an area defined by a pair of gate signal lines (or scanning signal lines) G and a pair of drain signal lines (or video signal lines) D. In this embodiment, a holding capacitor CST is arranged in each pixel to hold the electric potential of the pixel electrode PIX. Reference numeral CL designates a capacity line for supplying a reference voltage Vcom to the holding capacitor CST.

In FIGS. 2 and 9, although only one pixel electrode PIX is shown, this pixel electrode PIX, the thin film transistor (TFT) and the holding capacitor CST constitute one of a plurality of pixels which are arranged in a matrix shape. The gate signal line G of the previous line can be also used in place of the capacity line CL. In the thin film transistor (TFT) of each pixel, the source is connected to the pixel electrode PIX, and the drain is connected to the drain signal line D, and the gate is connected to the gate signal line G. The thin film transistor (TFT) functions as a switch for supplying a display voltage (gray scale voltage) to the pixel electrode PIX. In the operation of the electrical circuitry, the designations of the source and the drain become reverse in relation to the bias, but the drain here is shown as being connected to the drain signal line D.

The timing controller 110, the drain driver 130 and the gate driver 140 are respectively mounted on peripheral portions along two adjacent sides of the transparent insulating substrate (glass substrate) constituting the TFT substrate of the liquid crystal display panel 100. As mentioned above, the digital signal (display data, a clock signal, etc.) sent from the timing controller 110 is inputted to the head drain driver 130, and this signal is propagated on an internal signal line within each drain driver 130 and a transmission line path (wiring layer on the glass substrate) between the respective drain drivers 130, and, in this way, is inputted to each drain driver 130 in serial fashion. The source voltage of each drain driver 130 is supplied from the power source circuit 120 to each drain driver 130 through the FPC board 150.

Similarly, the digital signal (clock signal, etc.) sent from the timing controller 110 is inputted to the head gate driver 140, and this signal is propagated on an internal signal line within each gate driver 140 and a transmission line path between the respective gate drivers 140, and, in this way, is inputted to each gate driver 140 in serial fashion.

In this embodiment, as shown in FIG. 2, a resistance voltage dividing circuit 160, that is conventionally arranged within the power source circuit 120, is instead mounted on a peripheral portion of one side of the transparent insulating substrate (glass substrate) constituting the TFT substrate of the liquid crystal display panel 100.

Figure 3:
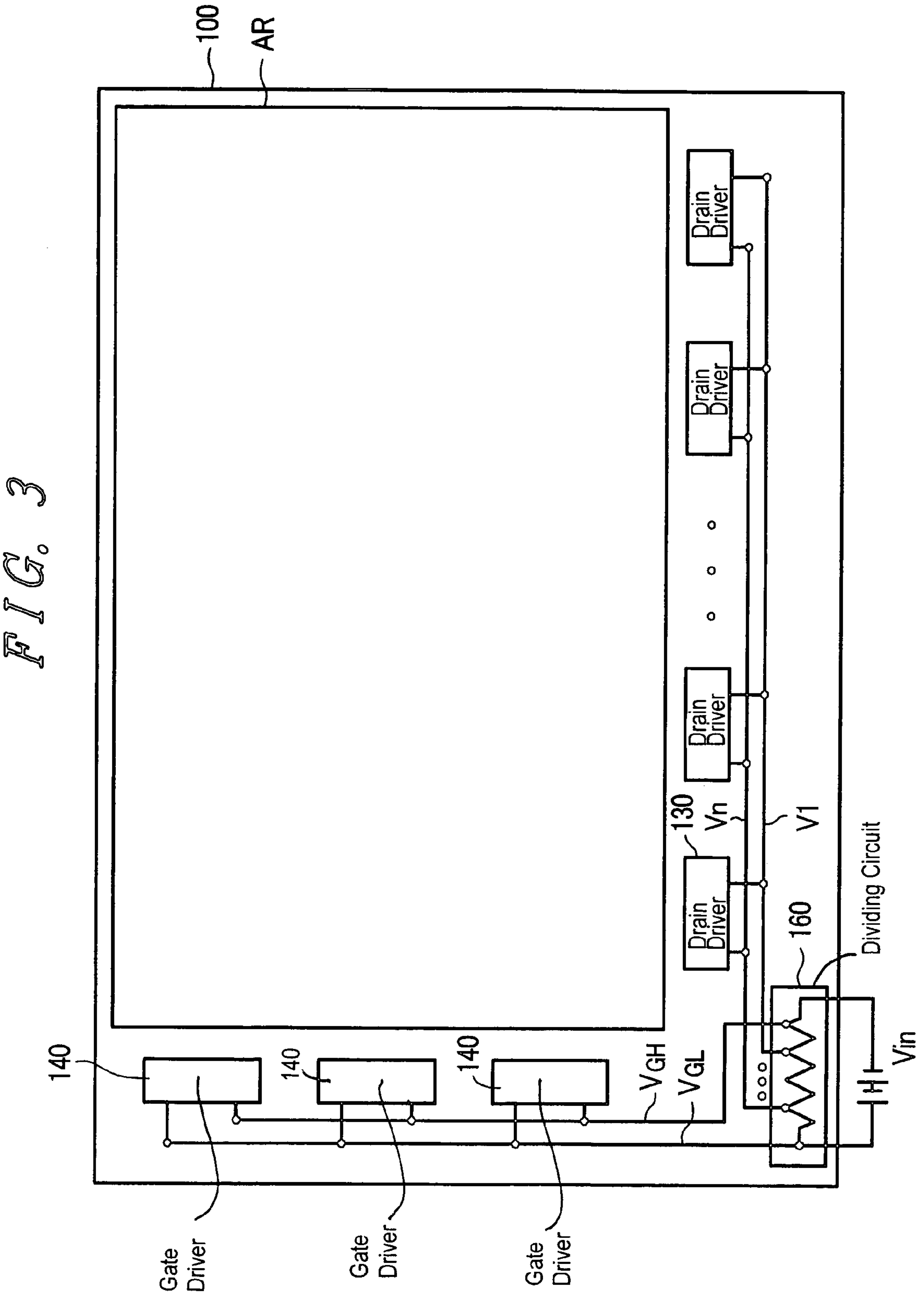
FIG. 3 is a schematic diagram illustrating a resistance voltage-dividing circuit function of the embodiment of the present invention.

FIG. 3 is a diagrammatic view illustrating the function of this resistance voltage-dividing circuit 160. As shown in FIG. 3, the resistance voltage dividing circuit 160 divides an input voltage (Vin) at a single voltage level, and it generates one portion ($V_{GH}$, $V_{GL}$) of the source voltage to be supplied to each gate driver 140, and plural gray scale reference voltages ($V_1$ to $V_n$) to be supplied to each drain driver 130. The input voltage (Vin) at the single voltage level supplied to this resistance voltage-dividing circuit 160 is supplied from the power source circuit 120 through the above-material flexible wiring board. Further, in accordance with the present invention, the resistance value of each voltage-dividing resistance element constituting this resistance voltage-dividing circuit 160 can be adjusted, as will be described later.

The source voltages ($V_{GH}$, $V_{GL}$) generated by the resistance voltage-dividing circuit 160 are supplied to the head gate driver 140, and these voltages are supplied to each gate driver 140 through the internal power line within each gate driver 140 and the transmission line path between the respective gate drivers 140. The gray scale reference voltages ($V_1$ to $V_n$) generated by the resistance voltage-dividing circuit 160 are inputted to the head drain driver 130, and these voltages are propagated on the internal signal line within each drain driver 130 and the transmission line path (wiring layer on the glass substrate) between the respective drain drivers 130, and, in this way, are inputted to the respective drain drivers 130 in series fashion.

The timing controller 110 is constructed as one semiconductor integrated circuit (LSI), and it controls and operates the drain drivers 130 and the gate drivers 140 on the basis of the respective display control signals, including the clock signal, the display timing signal, the horizontal synchronizing signal, the vertical synchronizing signal, and data (R G B) for display transmitted from the computer main frame side.

Figure 4:
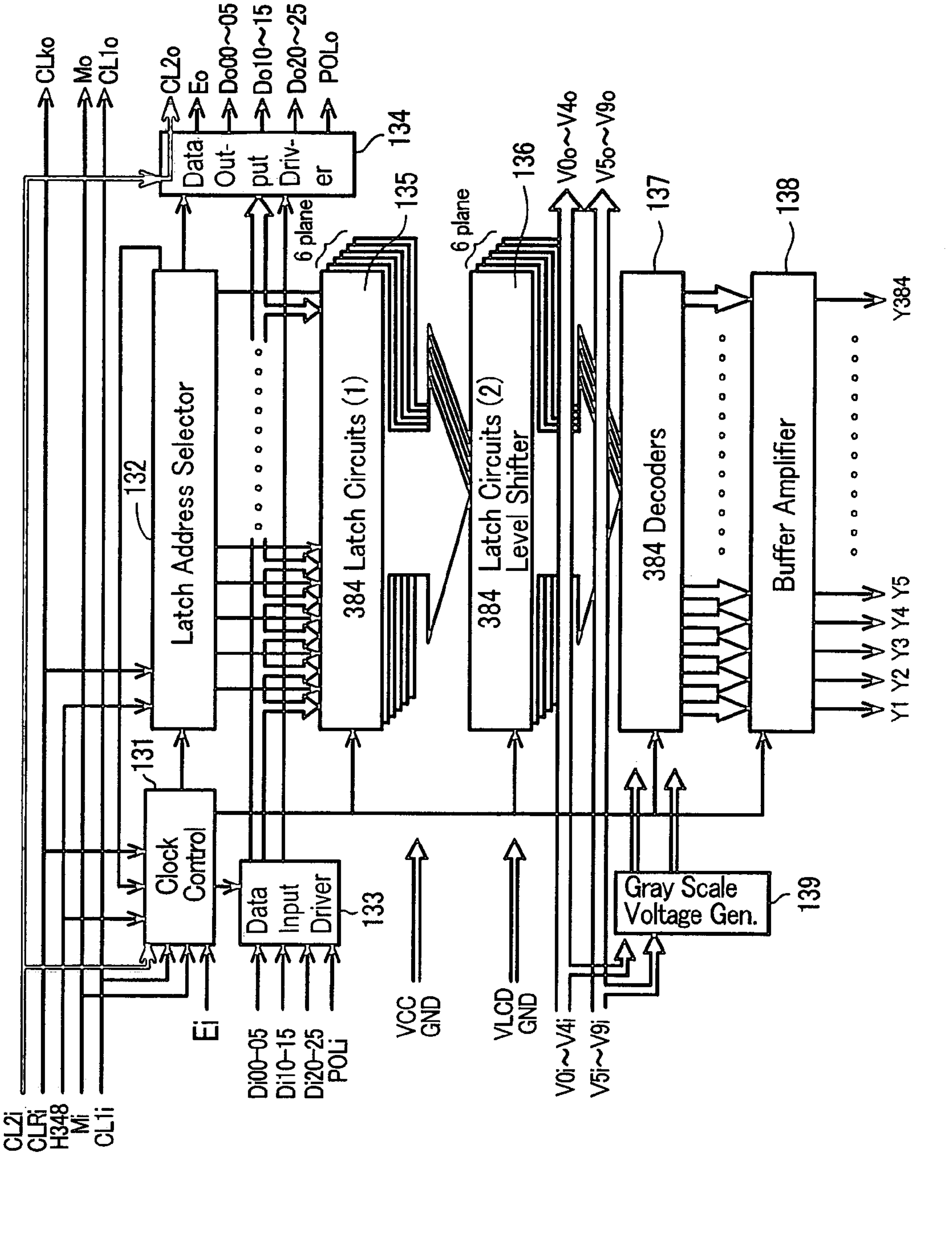
FIG. 4 is a block diagram showing one example of the internal construction of the drain driver used in the embodiment shown in FIG. 2.

FIG. 4 is a block diagram showing an example of the internal construction of a drain driver 130 shown in FIG. 2. In FIG. 4, the index i designates a signal inputted from the exterior, and the index o designates a signal propagated within the drain driver 130 and outputted to the exterior. For example, CL2*i* is a clock signal for a display data latch inputted from the exterior, and CL2*o* is a clock signal for a display data latch propagated within the drain driver 130 and outputted to the exterior (the drain driver 130 at the next stage).

A latch circuit (1) 135, as shown in this figure, sequentially latches the display data sent from a data taking-in-arithmetic circuit 133 on the basis of a data taking-in signal sent from a latch address selector 132. The display data sent from the data taking-in-arithmetic circuit 133 is outputted to the exterior via a data output circuit 134. Here, the latch address selector 132 generates the data taking-in signal on the basis of a clock signal for a display data latch (CL2; hereinafter simply called a clock signal (CL2)) sent from a clock control circuit 131.

A latch circuit (2) 136 takes-in the display data latched to the latch circuit (1) 135 on the basis of a clock (CL1) for output timing control sent from the clock control circuit 131, and it outputs the display data to a decoder circuit 137. The decoder circuit 137 selects a gray scale voltage corresponding to the display data sent from the latch circuit (2) 136 from the gray scale voltage of 64 gray scales supplied from a gray scale voltage generating circuit 139, and it outputs the gray scale voltage to an amplifying circuit 138. The amplifying circuit 138 amplifies (current-amplifies) the gray scale voltage sent from the decoder circuit 137, and it supplies the amplified gray scale voltage to each drain signal line D.

The gate driver 140 sequentially supplies a selecting scanning voltage at a high level in turn to each gate signal line G of the liquid crystal display panel 100 for every one horizontal scanning time on the basis of a frame starting direction signal (FLM) and a shift clock (CL3) sent from the timing controller 110. Thus, plural thin film transistors (TFTs) connected to each gate signal line G of the liquid crystal display panel 100 are turned on for one horizontal scanning time, and the gray scale voltage supplied from the amplifying circuit 138 is applied to each pixel electrode PIX, so that an image is displayed in the liquid crystal display panel 100.

The gray scale voltage generating circuit 139 generates the gray scale voltage of 64 gray scales of positive polarity on the basis of the gray scale reference voltage (V0 to V4) of positive polarity supplied from the exterior, and it also generates the gray scale voltage of 64 gray scales of negative polarity on the basis of the gray scale reference voltage (V5 to V9) of negative polarity supplied from the exterior.

As explained above, in this embodiment, the resistance voltage-dividing circuit 160 is formed on the glass substrate constituting the TFT substrate, and the resistance value of each voltage-dividing resistance element constituting this resistance voltage-dividing circuit 160 can be adjusted. Therefore, in this embodiment, for example, even when the source voltage supplied to each drain driver 130 and each gate driver 140 is changed between the time of the product design starting stage to the time of product forwarding to the customer, it is possible to rapidly cope with this change by adjusting the resistance value of each voltage-dividing resistance element of the resistance voltage-dividing circuit 160. Similarly, even when the number of gray scale reference voltages supplied to each drain driver 130 is changed in response to particular uses, etc., it is possible to rapidly cope with this change by adjusting the resistance value of each voltage-dividing resistance element of the resistance voltage-dividing circuit 160.

As a result, in this embodiment, it is possible to shorten the time until the forwarding of the liquid crystal display module to the customer is possible. Further, a single circuit can be used as the power source circuit 120, so that the cost of the liquid crystal display module is not increased.

As mentioned above, the flexible wiring board is connected between the interlace circuit substrate 30 and the glass substrate constituting the TFT substrate of the liquid crystal display panel 100. On the other hand, in recent years, with the advance in high definition in a liquid crystal display panel, the number of bits of display data has tended to increase. As a result, the number of terminals of the above-mentioned flexible wiring board, that is connected to a terminal of the glass substrate constituting the TFT substrate, has increased.

The increase in the number of terminals on the above-mentioned flexible wiring board causes a reduction in the wire thickness of the wiring layer. Moreover, there are many cases in which this flexible wiring board is bent on the rear side of the back light unit 20 due to a restriction on the product outer shape of the liquid crystal display module. Therefore, in the liquid crystal display module adopting the above-mentioned digital signal sequential transfer method, it has been understood that it is difficult to secure a sufficient connection reliability between the terminal of the glass substrate constituting the TFT substrate and the terminal of the flexible wiring board.

However, in this embodiment, the resistance voltage-dividing circuit 160 generates one portion ($V_{GH}$, $V_{GL}$) of the source voltage of each gate driver 140, and plural gray scale reference voltages ($V_1$ to $V_n$) are supplied, respectively, to each drain driver 130. Accordingly, since the wiring layer of the above-mentioned flexible wiring board can be deleted and reduced, it is possible to improve the connection reliability between the terminal of the glass substrate constituting the TFT substrate and the terminal of the flexible wiring board.

Each voltage-dividing resistance element constituting the resistance voltage-dividing circuit 160 is constructed by using a wiring material similar to that of the conventional drain signal line D or gate signal line G. For example, each voltage dividing resistance element can be made by a method in which the wire thickness of the wiring layer made of chromium (Cr) is reduced, etc.

In accordance with the present invention, various examples of methods of adjusting each voltage-dividing resistance element constituting the resistance voltage-dividing circuit 160 will be explained.

Figure 5:
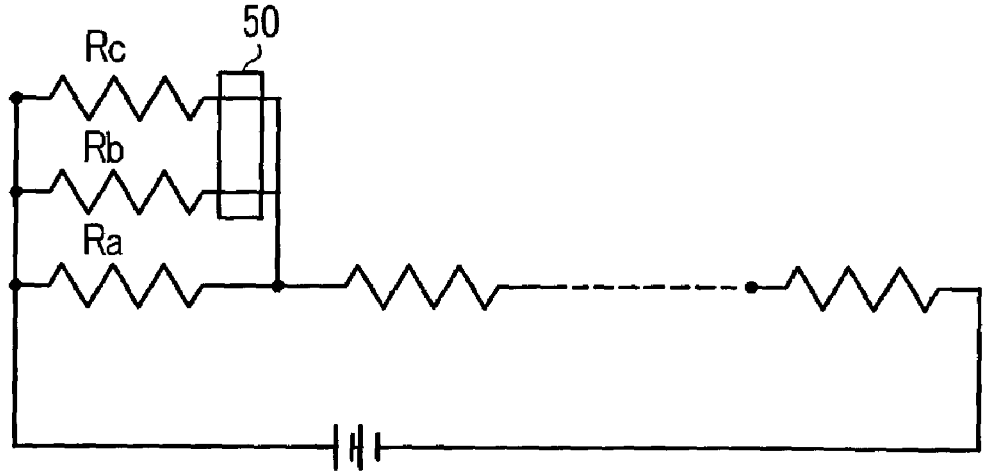
FIG. 5 is a schematic circuit diagram illustrating one example of a method of adjusting each voltage-dividing resistance element constituting the resistance voltage-dividing circuit used in the embodiment of the present invention.

FIG. 5 is a schematic circuit diagram illustrating one example of a method of adjusting each voltage-dividing resistance element constituting the resistance voltage-dividing circuit 160 in accordance with the present invention.

In the method illustrated in FIG. 5, each voltage-dividing resistance element constituting the resistance voltage dividing circuit 160 is constructed by a parallel resistance circuit having plural resistance elements, such as resistance elements Ra, Rb and Rc, electrically connected in parallel. When it is necessary to adjust the resistance value of this voltage-dividing resistance element, the resistance value is adjusted by changing combinations of the resistance elements Ra, Rb and Rc. For example, in the case of FIG. 5, the resistance value is adjusted by cutting a portion 50 using a laser, etc.

Figure 6:
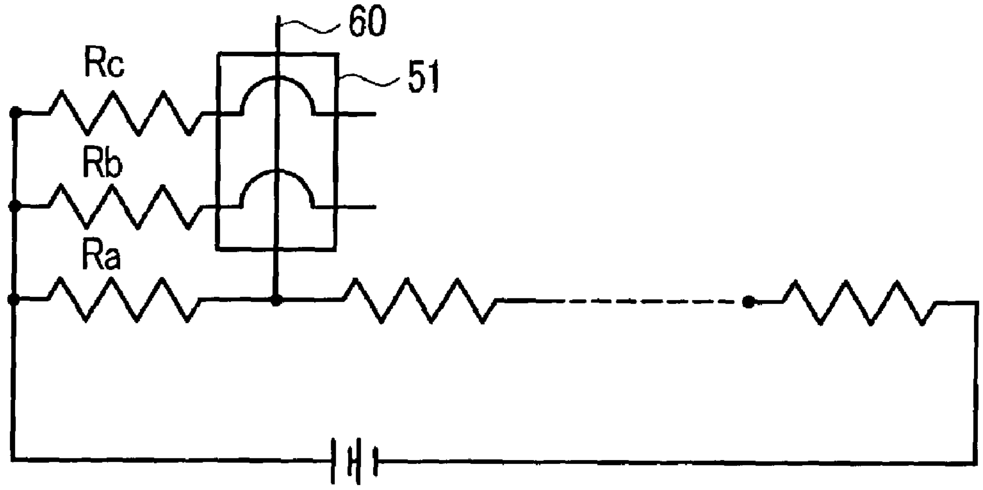
FIG. 6 is a schematic circuit diagram illustrating another example of a method of adjusting each voltage-dividing resistance element constituting the resistance voltage-dividing circuit used in the embodiment of the present invention.

FIG. 6 is a schematic circuit diagram illustrating another example of a method of adjusting each voltage-dividing resistance element constituting the resistance voltage-dividing circuit 160 in accordance with the present invention.

In accordance with this method, as shown in FIG. 6, a first resistance element Ra is arranged in the series circuit, and plural resistance elements, such as resistance elements Rb and Rc, are electrically connected in an open state to the resistance element Ra to form the voltage-dividing resistance elements constituting the resistance voltage-dividing circuit 160. When it is necessary to adjust the resistance value of this voltage-dividing resistance element, the resistance value is adjusted by connecting the resistance element Rb, the resistance element Rc, or both of these resistance elements Rb and Rc, in parallel with the resistance element Ra.

For example, in the case of FIG. 6, one end of each of the resistance elements Rb and Rc is connected to one end of the resistance element Ra. The other end of each of the resistance elements Rb and Rc and a wiring line 60 for short-circuiting, that is connected to the other end of the resistance element Ra, are arranged opposite to each other in an insulating state, being separated through an insulating film. When the resistance value is adjusted, a portion 51, as shown in FIG. 6, is cut by a laser, etc., and an electrically conductive film is buried in this portion 51. The resistance value is adjusted by electrically connecting the other ends of at least one of the resistance elements Rb and Rc to the wiring 60 for connecting the resistance element or elements in parallel with the resistance element Ra.

Figure 7A:
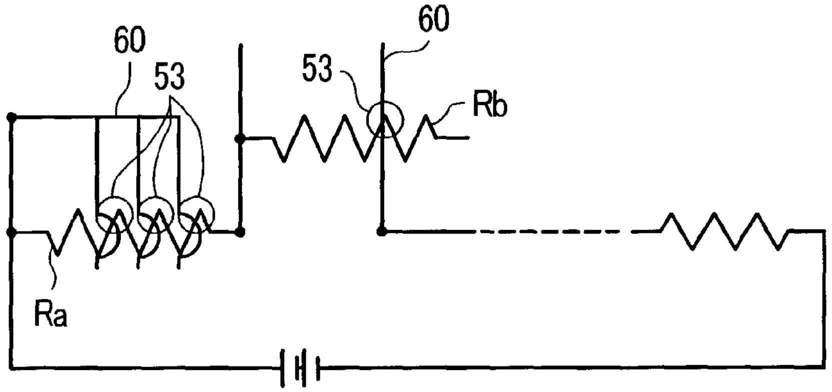
FIG. 7A is a schematic circuit diagram and FIG. 7B is a sectional view illustrating another example of a method of adjusting each voltage-dividing resistance element constituting the resistance voltage-dividing circuit used in the embodiment of the present invention.
Figure 7B:
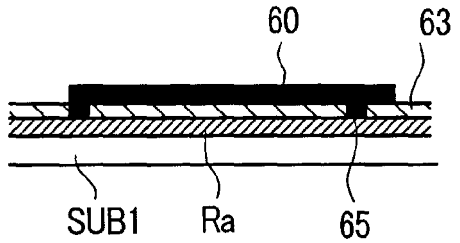

FIGS. 7A and 7B are views illustrating another example of a method of adjusting each voltage-dividing resistance element constituting the resistance voltage-dividing circuit 160 in accordance with the present invention. FIG. 7A is a schematic circuit diagram, and FIG. 7B is a sectional view showing the actual structure. In FIG. 7B, reference numeral SUB designates a glass substrate constituting the TFT substrate.

In the methods illustrated by FIGS. 5 and 6, the resistance value of each voltage-dividing resistance element is adjusted by adjusting the number of resistance elements constituting each voltage-dividing resistance element. However, in the method illustrated in FIGS. 7A and 7B, the resistance value of each voltage-dividing resistance element itself is adjusted.

Namely, as shown in FIG. 7A, a wiring 60 for short-circuiting is formed such that one end of the wiring 60 is connected to one end of the voltage-dividing resistance elements Ra and Rb, and the other end of the wiring 60 is superposed on the voltage-dividing resistance elements Ra and Rb through an insulating film. When the resistance value is adjusted, a portion 53 shown in FIG. 7A is cut by a laser, etc., and an electrically conductive film is buried in this portion 53. The resistance value is adjusted by short-circuiting one portion of the resistance elements Ra and Rb.

For example, in the case of FIG. 7B, a wiring 60 for short-circuiting is formed such that one end of the wiring 60 is connected to one end of the voltage-dividing resistance element Ra, and the other end of the wiring 60 is superposed on the voltage-dividing resistance element Ra through an insulating film 63. When the resistance value is adjusted, one portion (portion 53 shown in FIG. 7A) of the wiring 60 is cut by a laser, etc., and an electrically conductive film 65 is buried in this portion. The resistance value is adjusted by short-circuiting one portion of the resistance element Ra.

The present invention has been explained with reference to various embodiments in which the present invention is applied to a liquid crystal display device in which the digital signal sequential transfer method is employed. However, the present invention is not limited to these embodiments. For example, the present invention also can be applied to a structure in which each drain driver 130 and each gate driver 140 are arranged on the side face of the glass substrate constituting the TFT substrate, as shown in FIG. 8.

Figure 8:
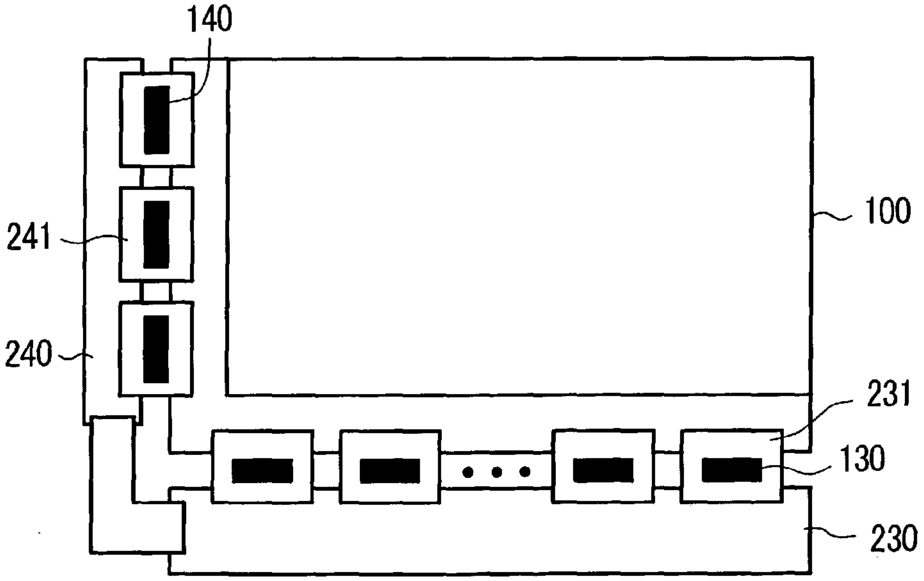
FIG. 8 is a schematic sectional view illustrating another example of the liquid crystal display module to which the present invention is applied.

In FIG. 8, reference numerals 230, 240 designate driving circuit substrates, and reference numerals 231, 241 designate tape carrier packages (normally called TCPs) each mounting a semiconductor chip constituting the drain driver 130 and the gate driver 140. When the present invention is applied to a liquid crystal display module as shown in FIG. 8, one portion ($V_{GH}$, $V_{GL}$) of the source voltage of each gate driver 140 generated by the resistance voltage-dividing circuit 160, and plural gray scale reference voltages ($V_1$ to $V_n$) supplied to each drain driver 130 are first sent from the glass substrate constituting the TFT substrate to the driving circuit substrates (230, 240), and then they are inputted to each gate driver 140 and each drain driver 130.

As mentioned above, the invention made by the present inventors is has been explained in detail on the basis of the above-described embodiments. However, the present invention is not limited to the above-described embodiments, but can be variously changed to an extent not deviating from its essential features.

The effects obtained by typical features of the invention disclosed in the present application will be briefly set forth as follows.

In accordance with the liquid crystal display device of the present invention, the period from the development through manufacture to product forwarding can be shortened in spite of various kinds of design changes implemented along the way, and the cost can be reduced in comparison with the conventional case.

What is claimed is:

1. A method of manufacture of a liquid crystal display device comprising a liquid crystal display element having a first substrate, a second substrate and a liquid crystal supported between said first and second substrates; signal lines, pixel electrodes, and thin film transistors formed on said first substrate, said thin film transistors being electrically connected to respective signal lines and pixel electrodes: plural semiconductor chips for operating said liquid crystal display element; and a power source circuit; wherein said first substrate has a resistance voltage-dividing circuit mounted on a peripheral portion along one side thereof; and said resistance voltage-dividing circuit divides the voltage supplied from said power source circuit, and supplies the divided voltage to each of said semiconductor chips;

the manufacturing method comprising:

a first process for forming plural voltage-dividing resistance elements constituting said resistance voltage-dividing circuit and said signal lines by a same wiring material; and a second process for adjusting at least one resistance value among the plural resistance elements formed in said first process.

2. A method of manufacture of a liquid crystal display device according to claim 1, wherein said first process includes a process for constructing at least one of said plural voltage-dividing resistance elements by a parallel resistance circuit having plural resistance elements electrically connected in parallel; and said second process is a process for retaining at least one of said plural resistance elements constituting said parallel resistance circuit, and separating the other resistance elements from said at least one resistance element.

3. A method of manufacture of a liquid crystal display device according to claim 1, wherein said first process includes a process for constructing at least one of said plural voltage-dividing resistance elements by a first resistance element and plural resistance elements arranged near said first resistance element; and said second process is a process for electrically connecting at least one of said plural resistance elements in parallel to said first resistance element.

4. A method of manufacturing of a liquid crystal display device comprising:

a first substrate, a second substrate, and a liquid crystal supported between the first substrate and the second substrate;

a signal line, a pixel electrode, and a thin film transistor formed on the first substrate and electrically connected to the signal line and the pixel electrode;

a semiconductor chip electrically connected to the signal line; and plural voltage-dividing resistance elements formed on the first substrate, and supplying plural gray scale reference voltages to the semiconductor chip;

the manufacturing method comprising:

a first process for forming the plural voltage-dividing resistance elements and the signal line by a same wiring material; and a second process for adjusting at least one resistance value of the plural voltage-dividing resistance elements formed in said first process.

5. A method of manufacturing of a liquid crystal display device according to claim 4, wherein the first process includes a process for electrically connecting one side of first plural resistance elements of the plural voltage-dividing resistance elements in parallel by the same wiring material, and electrically connecting the other side of first plural resistance elements in parallel by the same wiring material; and wherein the second process includes a process for separating the other side of the first plural resistance elements.

6. A method of manufacturing of a liquid crystal display device according to claim 5, wherein the second process includes a process for separating the other side of the first plural resistance elements by laser.

7. A method of manufacturing of a liquid crystal display device according to claim 4, wherein the first process includes a process for forming a short-circuiting wiring and an insulating film formed between the short-circuiting wiring and the plural voltage-dividing resistance elements; and wherein the second process includes a process for electrically connecting at least one portion of the plural voltage-dividing resistance elements and the short-circuiting wiring via at least one contact hole formed in the insulating film.

8. A method of manufacturing of a liquid crystal display device according to claim 7, wherein the second process includes a process for forming the contact hole using laser.

9. A liquid crystal display device comprising:

a first substrate, a second substrate, and a liquid crystal supported between the first substrate and the second substrate;

a signal line, a pixel electrode, and a thin film transistor formed on the first substrate and electrically connected to the signal line and the pixel electrode, a semiconductor chip electrically connected to the signal line; and plural voltage-dividing resistance elements formed on the first substrate, and supplying plural gray scale reference voltages to the semiconductor chip;

wherein the plural voltage-dividing resistance elements and the signal line are constructed by a same wiring material.

10. A liquid crystal display device according to claim 9, wherein the signal line is a gate signal line.

11. A liquid crystal display device according to claim 9, wherein the plural voltage-dividing resistance elements comprise plural resistance elements, and one side of the plural resistance elements are electrically connected and the other side of the plural resistance elements are not electrically connected.

12. A liquid crystal display device according to claim 11, wherein the other side of the first plural resistance elements are cut by laser.

13. A liquid crystal display device according to claim 11, wherein the one side of the first plural resistance elements are electrically connected by the same wiring material.

14. A liquid crystal display device according to claim 9, further comprises a short-circuiting wiring, and an insulating film formed between the short-circuiting wiring and the plural voltage-dividing resistance elements;

wherein the plural voltage-dividing resistance elements comprises plural resistance elements, and one side of the plural resistance elements are electrically connected, and the other side of the plural resistance elements are electrically connected by the short-circuiting wiring.

15. A liquid crystal display device according to claim 14, wherein the one side of the second plural resistance elements are electrically connected by the same wiring material.

16. A liquid crystal display device according to claim 9, further comprises a short-circuiting wiring, and an insulating film formed between the short-circuiting wiring and the plural voltage-dividing resistance elements;

wherein the plural voltage-dividing resistance elements comprises a resistance element, and one side of the resistance element is electrically connected to the short-circuiting wiring, and the other side of the resistance element is electrically connected to the short-circuiting wiring via a contact hole formed in the insulating film, wherein the contact hole is formed by a laser cut.

* * * * *